United States Patent [19]

Rex

[11] 4,187,995
[45] Feb. 12, 1980

[54] EMERGENCY LOCKING MECHANISM FOR SEAT BELTS

[75] Inventor: Gert I. Rex, Halmstad, Sweden

[73] Assignee: NYA AB Nyhems Mekaniska Verkstad, Sweden

[21] Appl. No.: 949,065

[22] Filed: Oct. 6, 1978

[30] Foreign Application Priority Data

Oct. 17, 1977 [SE] Sweden ............................. 7711694

[51] Int. Cl.² .................... A62B 35/02; B65H 75/48
[52] U.S. Cl. ........................ 242/107.4 A; 242/107.4 B
[58] Field of Search ................ 242/107.4 R–107.4 E; 297/388; 280/744–747

[56] References Cited

U.S. PATENT DOCUMENTS

| 4,059,242 | 11/1977 | Tanaka | 242/107.4 A |
| 4,108,394 | 8/1978 | Oishi et al. | 242/107.4 A |

FOREIGN PATENT DOCUMENTS 1356257  6/1974  United Kingdom ............ 242/107.4 A

*Primary Examiner*—John M. Jillions
*Attorney, Agent, or Firm*—Shlesinger, Fitzsimmons & Shlesinger

[57] ABSTRACT

The mechanism includes a ratchet wheel, which is fixed to the spindle upon which a safety belt is wound, and a transfer ring, which is mounted around the wheel for limited rotation relative thereto. A tiltable synchronizing arm is mounted in a recess in the bottom of the ring for limited radial movement toward and away from the teeth of the ratchet wheel in response to an inertia trigger or pendulum member which is suspended beneath the arm. When the inertia trigger is operated, it tilts one end of the arm into the path of a tooth on the rotating ratchet wheel. When struck by the tooth, the arm is tilted in the opposite direction causing the opposite end of the arm to swing into the space between this tooth and the next successive tooth on the ratchet wheel, thus connecting the ring to the ratchet wheel. Further rotation of the wheel deflects the ring and causes it to pivot the inner edge of a locking bar into locking engagement with a tooth on the ratchet wheel to prevent further rotation thereof. The mechanism prevents the locking bar from pivoting toward the teeth on the ratchet wheel except when the inner edge of the bar registers with a space between two adjacent teeth on the wheel, thus preventing any undesirable point-to-point contact. An associated mechanism is also provided to operate the locking bar in response to removal of the safety belt from the wheel at a rate which exceeds a predetermined value.

6 Claims, 6 Drawing Figures

EMERGENCY LOCKING MECHANISM FOR SEAT BELTS

The following invention concerns an emergency locking mechanism for seat belts designed to hold a person inside a vehicle and comprising a spindle for retracting the belt mounted in a casing immovably fixed in the vehicle, which spindle may be locked by means of a locking mechanism incorporating an inertia trigger in the form of an inertia-responsive body which is mounted so as to be able to move within the casing, so devised that if the vehicle changes the speed at which it is travelling and causes a predetermined number of g-forces to be exceeded, it will cause at least one locking arm or pawl to engage with a tooth at the rim of a wheel mounted on the spindle through the agency of an element for the transfer of its motion ("transfer element") rotatable round the circumference of the wheel.

The inertia trigger may, for instance, be given the form of a pendulum or ball, and its function is, by inertia, to carry out a movement relative to the casing which will activate the locking mechanism if changes of speed occur in the vehicle in excess of a given limit, preferably changes of speed in any direction, that is both in the direction of travel and at an angle to this. In order to ensure that the emergency locking mechanism will be able to halt the motion of the person attached in the seat belt at a sufficiently early stage in the event of a traffic accident, etc., the belt must be locked after it has been unwound only a very short distance from the casing. In practical use, it has sometimes happened in emergency locking mechanisms of the types employed hitherto that, upon activation of the mechanism, the locking arm strikes the point of a tooth instead of coming to rest in the space between two adjacent teeth on the wheel, meaning that the belt continues unwinding until the locking arm has once again been able to return to the proper locking position. Such a long interval may therefore occur before the locking mechanism is properly activated that the traveller may be hurled, say, against the windscreen of the vehicle.

The purpose of the invention is to overcome this drawback, and this is substantially achieved in that a synchronizing arm is mounted so as to be able to tilt within the transfer element and has two separate projections at each end pointing in towards the tooth rim, this arm being so devised that upon deflection of the inertia trigger and the unwinding of the belt in the direction of rotation of the tooth rim, the leading projection is tilted inwards and strikes the point of a tooth with its rear edge, only to be forced back at once in the other direction by the tooth and so guiding instead the rear projection of the arm into a space between two adjacent teeth immediately opposite it and bringing the tooth rim into connection with the transfer element, which then causes the locking arm to move into the locked position only once it is located exactly opposite a space between two adjacent teeth.

In the following paragraphs the invention will be described in greater detail by reference to embodiments illustrated as examples in the attached drawings, and at the same time other characteristic properties of the invention will be discussed as well.

Figure 1:
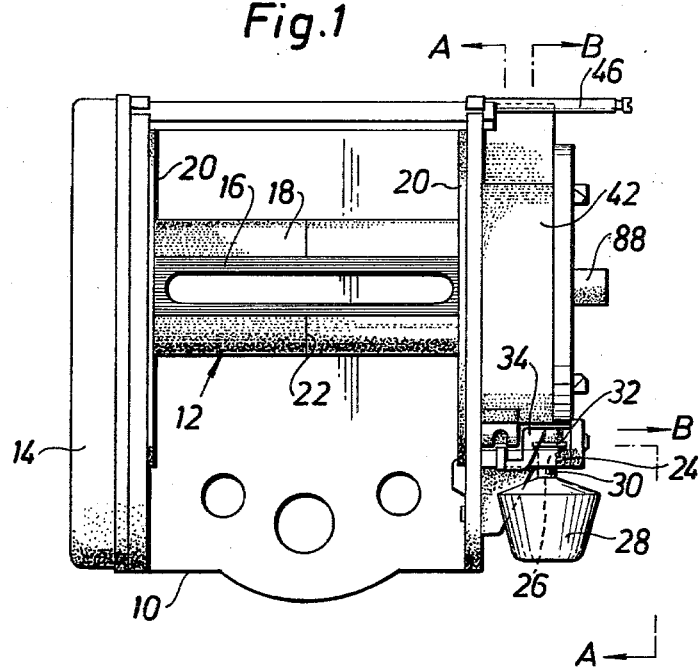
FIG. 1 shows a front view of an emergency locking mechanism, partly in section.

In the drawings, the numeral 10 denotes a casing more or less in the shape of the letter U housing an emergency locking mechanism for a seat belt which is wound on a spindle mounted in the sides of the casing and assigned the numeral 12 generally. The belt itself and a coil spring serving to wind it on the spindle located in a housing 14 are of types already known in themselves and are not shown in the drawing. The casing is intended to be mounted on a non-movable part of the vehicle. The spindle 12 comprises a central, flat element, strip or pin 16 of metal mounted inside a surrounding cylindrical sleeve 18 rigidly attached to disc-shaped end pieces 20, which should preferably be of an easily-cast, non-metallic material such as plastic. The sleeve 18 may be readily divided, as illustrated at 22 in the drawing, and the individual sections may be longitudinally slotted to facilitate the mounting of the spindle between the sides of the casing. The flat pin 16 at the axis of the spindle is movable in a direction along the axis of the cylindrical sleeve 18 yet cannot rotate independently of the latter. One end of this pin 16 projects into the housing 14 where it is connected to the coil spring, while the other protrudes through the side of the casing for insertion into the locking mechanism constructed in accordance with the invention.

A bracket 24 rigidly secured to the casing 10 is pierced by a vertical hole or slot 26 in which an inertia trigger in the form of a pendulum 28 is suspended. For this purpose the pendulum is attached to a rod of small diameter running with room to spare through the slot 26 and which is connected at its upper end with a round disc or plate 32 nestling against the upper surface of the slot, which thus forms a circular seat for the pendulum. The design of the mechanism is thus already familiar in that in whatever direction the pendulum 28 may swing, a portion of the edge of the plate 32 will be raised out of the slot 26 and raise an arm 34 mounted on a spindle 36 running through the rigidly-secured bracket 24. The construction of the mechanism is further such that the pendulum 28 will be set in motion only when the g-force produced by the change of speed influencing the course of the vehicle exceeds a predetermined value, say 0.4 or 0.5.

One end of the pin 16 at the axis of the spindle is rigidly united to a disc 38, the rim 40 of which is provided with teeth forming a ratchet. This disc is, in turn, enclosed by a ring-shaped transfer element 42 mounted in the casing so as to be rotatable to a limited extent round the same axis as the spindle 12 and its pin 16. The ring is best provided with an arm 44, the free end of which bears upon a rigidly-fastened pin 46. Both the ring and its arm 44 may be of some plastic material. The arm itself is flexible, so that when the ring is set in rotation, in the direction of the arrow 48 in FIG. 3, it will be put under tension and tend to return the ring to its initial position in the manner described in greater detail below. The arm 44 is provided with a raised head 49 which, as the ring rotates, is forced up against the pin 46 and causes the free end of the arm to be pressed down towards the ring 42.

Figure 3:
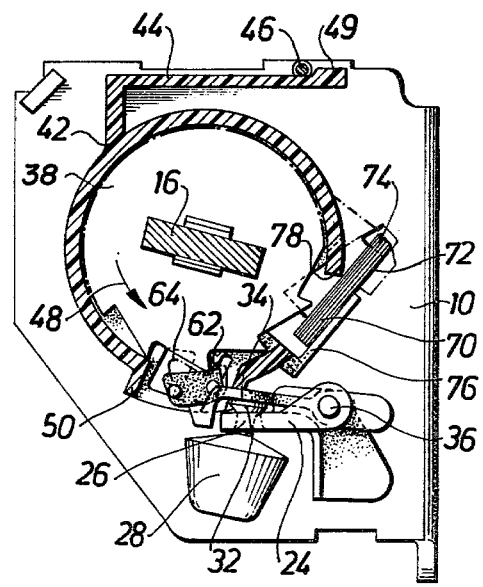
Figure 4:
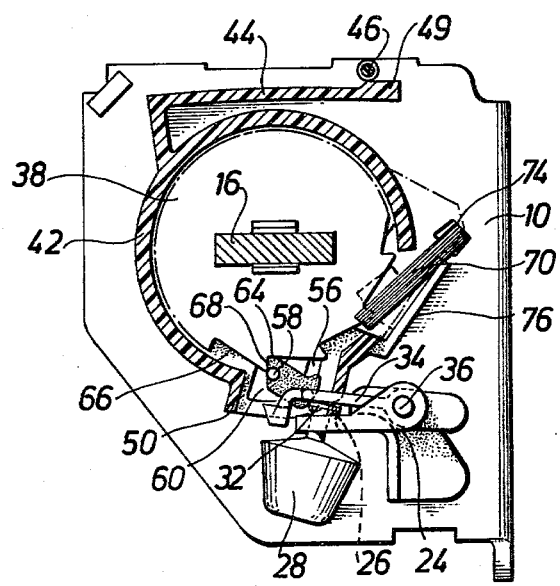

A space is cut in a lower section 50 of the ring 42 in which a synchronizing device is mounted and controlled, this latter being in the form of a small plate or synchronizing arm 52 which transfers the locking action from the pendulum to the rotatable toothed ratchet disc 38 mounted on the spindle 16. The leading edge of this plate as seen in the direction of the arrow 48 is provided with two pins 54 (see FIG. 2), each running in oblique radial grooves or slots 56 located in the lower section 50 of the ring. These pins allow a radial movement of the plate and allow at the same time the rear end of the plate, as seen in the direction of the arrow 48, to pivot about them, while the rear end may itself be provided with opposite pins 58 running in grooves or slots 60 wider than those indicated by the numeral 56. The rear end of the plate 52 is heavy by comparison with the fulcrum pins 54, while the pins here denoted 58 prevent the plate 52 from tipping over in a clockwise direction as shown in FIGS. 2-4.

Figure 2:
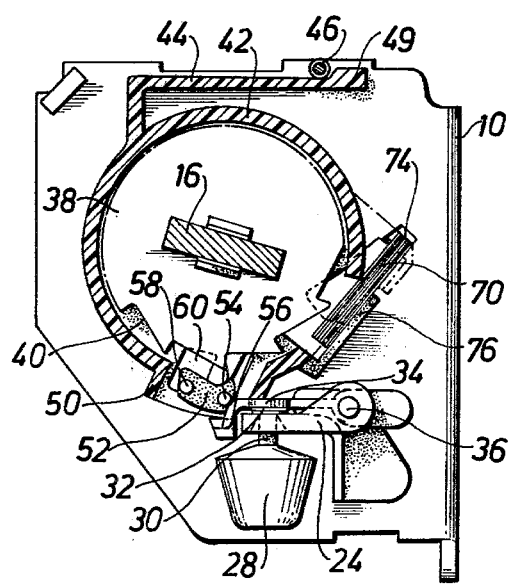
FIGS. 2, 3 and 4 show a section of the emergency locking mechanism along the line A—A in FIG. 1, the locking mechanisms being shown in different stages of action.

In FIG. 2 the pendulum 28 is shown in the neutral position, and its entire plate 30 is thus nestling snugly in the seat formed by the opening in the bracket. However, if the speed at which the vehicle is travelling is suddenly changed, the pendulum moves out of the neutral position, as shown in FIG. 3, and initiates the movement of the mechanism which will lock the spindle 12 and hence the belt. In the initial stage of this locking action, the plate 32 attached to the pendulum raises the arm 34, as shown in FIG. 3, and this in turn raises the rounded front of the upper edge 62 of the plate 52 up and in past the point of the nearest tooth of the disc 38. At the same time the seat belt has started to unwind and the ratchet disc 38 has begun to rotate in the direction of the arrow 48, thus carrying the edge 62 of the plate with it and tilting it in a clockwise direction so that its opposite or rear edge 64 (see FIG. 4) moves in towards the next tooth of the disc 38. This edge, entering the space between the points of the two teeth, comes to rest against the leading edge of the tooth, which is radially sloping or undercut. The angle of slope of the rear edges 66 of the teeth to their points is, however, small. In FIG. 4 the edge 64 of the plate has come to rest against the leading edge 68 of a tooth and the transfer ring 42 and toothed disc 38 have therefore been connected and each is in a preset position by relation to the other.

One of the two longer sides of a locking device 70, in the form of a rectangular plate or pawl, runs in an angular slot 72 in the rigidly-secured casing 10. The radial outer end 74 of this pawl bears against the casing; the pawl then runs diagonally inwards and in its neutral or unlocked position rests against a diagonally inclined tongue 76 attached to the transfer ring 42. The inward-pointing end of the inclined pawl passes through an opening 78 in the ring but still remains radially out of reach of the teeth of the disc. When the transfer ring 42 is connected with the ratchet wheel 38 by the synchronizing arm 52 as illustrated in FIG. 4, the ring is set in motion by the rotation of the disc at the same time as the belt unwinds, and the tongue 76 attached to the ring thus causes the pawl 70 to pivot about its outer supporting edge 74 and bring its inward-pointing end into the space between two adjacent teeth. When the rotation of the ratchet wheel is brought to a halt by the nearest tooth engaging with the pawl, the wheel is locked, and with it the belt. The fact that rotation of the transfer ring 42 is only initiated at a preset peripheral position relative to the opening 78 and guiding surface 76 of the ring ensures that the pawl 70 will under all circumstances be located at a position opposite a space between two teeth before moving into the locked position and engaging with the ratchet wheel. The pawl can therefore never strike the point of a tooth and be jerked out of position. Since the transfer ring 42 is carried round by the the toothed disc, the flexible arm 44, which causes the ring and other parts of the mechanism working in conjunction with it to return to the neutral position once the change of speed in the vehicle has ceased to have any effect, is put under tension.

Apart from the pendulum 28, only those parts of the mechanism of the emergency locking device which need to be capable of withstanding the great load put upon them during an accident, i.e. the spindle 16, the ratchet wheel 38 and the pawl 70, plus the casing itself 10, need to be of a particularly strong material such as metal, and the remaining components may be of some plastic material, etc.

Figure 5:
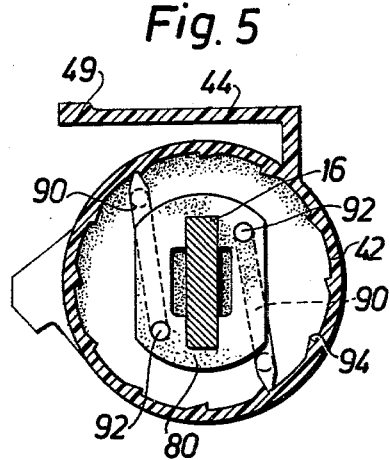
FIG. 5 shows a section of the mechanism along the line B—B in FIG. 1.
Figure 6:
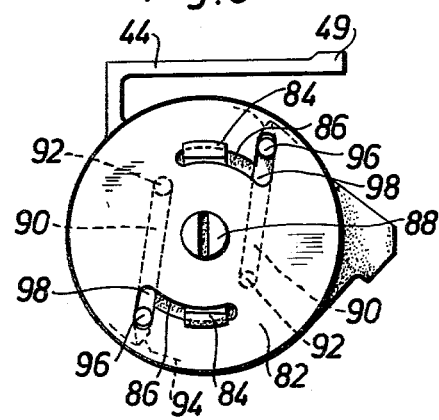
FIG. 6 shows a side view of the lock seen in the direction of the arrows along the section A—A.

The emergency locking mechanism may be provided with a locking device which is activated, in known fashion, only when the seat belt is unwound under the action of a given relatively high g-force, such as 1. In the embodiment, this device is in the form of a plate 80 (FIG. 5) rigidly connected with the end of the spindle strip or pin 16 and working in conjunction with another, coaxially mounted plate 82 (FIG. 6). Two diametrically opposed studs 84 located on the inner plate 80 protrude through peripheral slots 86 in the outer plate. These slots 86, extending for part of the way round the plate's circumference, allow a certain limited movement of this plate 82 relative to the other, rotatably mounted as it is on the end screw 88 of the spindle pin. Two locking arms or pawls 90 are mounted on pivot pins 92 on the inner plate 80 connected to the spindle 16. These elongated pawls 90 extend diagonally out from the pivots 92 towards a ratchet ring or teeth 94 located on the inner circumference of the transfer ring 42, and at their outer end are provided with studs 96 protruding through grooves or slots 98 in the outer disc 82. Like the elongated pawls, these slots slope diagonally, so that if the belt is unwound at sufficiently high acceleration only the inner plate will rotate with it, while inertia will cause the outer plate 82 to lag behind, thus pivoting the pawls 90 round the pivot pins 92 until their outer ends each engage a catch 94 of the ring 42. Only then can the ring revolve in time with the unwinding of the belt and result in the locking arm 70 engaging a tooth on the ratchet wheel 38. Here, too, the fact that the peripheral position of the pawls 90 relative to the locking arm 70 is accurately controlled ensures that the latter can enter a space between two adjacent teeth on the ratchet wheel 38 only when it is positioned exactly opposite such a space. In this case, too, the pawl 70 is therefore prevented from striking the point of a tooth.

Clearly, the invention need not be limited to the embodiments described and illustrated here, but may be varied in several respects while still remaining within the conceptual framework on which it is based. Thus, the tooth rim 38 may be positioned on a stationary part of the casing while the locking arm 70 may be made rotatable. An arm may be rigidly mounted at the end 88 of the spindle pin extending radially out towards the pendulum 28 and so designed and devised as to prevent the pendulum 28 from moving and causing a rattling noise when the vehicle is travelling normally. Unlocking of the pendulum is achieved in that the arm rotates with the spindle 16 as soon as the seat belt starts to unwind in the event of an accident, etc., and the pendulum is on the point of activating the mechanism. In this version the arm is retained by friction on pin 88 allowing limited angular motion relative to the pendulum.

I claim:

1. In an emergency locking mechanism for seat belts having a casing adapted to be fixed to a vehicle, a rotatable spindle on said casing for reeling up a seat belt, a toothed ratchet wheel secured to said spindle for rotation therewith, and a locking bar mounted on said casing for tilting movement into and out of a locking position in which one edge thereof projects into a space between adjacent teeth on said wheel to prevent rotation thereof in a belt releasing direction, improved means for tilting said bar into its locking position, comprising a transfer element surrounding at least a portion of said wheel and operatively connected to said bar, a synchronizing arm movably mounted on said transfer element and actuatable to connect said element to said ratchet wheel for movement thereby, and an inertia trigger on said casing for actuating said arm when the change in speed of said vehicle exceeds a predetermined g-value, said synchronizing arm having spaced projections on opposite ends, respectively, thereof facing the teeth on the rim of said wheel, and being mounted on said element so that upon actuation thereof by said inertia trigger one of said projections is tilted in one direction into engagement with one tooth on said wheel and is forced thereby back in the opposite direction, whereby the tilting movement in said opposite direction causes the projection on the opposite end of said arm to be tilted into the space between a pair of adjacent teeth on said wheel, thereby connecting said transfer element to said wheel, and said transfer element being operative upon movement thereof by said ratchet wheel to tilt said bar into its locking position only when said one edge of the bar registers with a space between adjacent teeth on the rim of said wheel.

2. The emergency locking mechanism as defined in claim 1, wherein the transfer element is mounted to be rotatable at least to a certain extent on the casing, and around the same, or approximately the same, axis as the ratchet wheel and spindle.

3. The emergency locking mechanism as defined in claim 1, wherein the synchronizing arm is in the form of a plate, one part of which is provided with pins slidably guided in opposed grooves cut radially in the transfer element, so that when activated by the inertia trigger, the arm is moved toward the toothed rim of said wheel to have said one projection thereon struck by said one tooth, whereby the arm is pivoted on the pins and then engages its other projection with another tooth on the toothed rim of said wheel, and thus achieves synchronization of the transfer element with the ratchet wheel around a common axis.

4. The emergency locking mechanism as defined in claim 1, wherein said locking bar is mounted for pivotal movement at one end thereof in the casing, and projects at its opposite end through an opening in the transfer element, and radially into the interior of the element in such a manner that in the final phase of the locking action, the transfer element causes the locking bar to pivot about said one end thereof, and causes its radially interior end to mesh with a space between two adjacent teeth on said wheel.

5. The emergency locking mechanism as defined in claim 1, wherein said transfer element is in the form of a ring concentrically surrounding the ratchet wheel, and has therein an axially extending opening through which one end of said locking bar projects for engagement with the rim of said wheel, and has therein a second opening angularly spaced from the first-named opening for releasably supporting therein said synchronizing arm, the angular distance between said openings being determined by the division of the teeth on the rim of said ratchet wheel.

6. The emergency locking mechanism as defined in claim 1, wherein a first plate is rigidly connected to one end of said spindle, a second plate is mounted on said casing in spaced relation to said first plate, and for limited rotation relative to said first plate when the seatbelt is unwound from said spindle at a rate exceeding a predetermined value, and a locking arm is mounted on said first plate in confronting relation to a plurality of angularly spaced teeth formed on said transfer element, said locking arm being operable, when the associated seat belt is unwound from said spindle at a rate which exceeds said predetermined value, to be moved into engagement with one of said teeth on said transfer element, thereby to impart the rotation of said spindle to said transfer element, and to effect tilting movement of said locking bar into its locking position, said tilting movement of said bar occurring only when said one edge of the bar is in registry with a space between adjacent teeth on said ratchet wheel.

* * * * *